US012745025B2

(12) United States Patent
Ren et al.

(10) Patent No.: US 12,745,025 B2
(45) **Date of Patent: *Sep. 22, 2026**

(54) SPEAKER BOX

(71) Applicant: AAC Microtech (Changzhou) Co., Ltd., Changzhou (CN)

(72) Inventors: Li Ren, Changzhou (CN); Chaoyuan Li, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 204 days.

This patent is subject to a terminal disclaimer.

(21) Appl. No.: 18/395,720

(22) Filed: Dec. 25, 2023

(65) Prior Publication Data

US 2024/0340562 A1 Oct. 10, 2024

Related U.S. Application Data

(63) Continuation of application No. PCT/CN2023/086953, filed on Apr. 7, 2023.

(51) Int. Cl.
*H04R 1/28* (2006.01)
*H04R 1/02* (2006.01)
*H04R 1/22* (2006.01)

(52) U.S. Cl.
CPC .................................... *H04R 1/02* (2013.01)

(58) Field of Classification Search
CPC .......... H04R 1/02; H04R 1/025; H04R 1/021; H04R 1/20; H04R 1/22; H04R 1/28; H04R 1/2803; H04R 1/2815; H04R 1/2819; H04R 1/2884; H04R 1/2888; H04R 9/06; H04R 9/02; H04R 2201/02; H04R 2201/029; H04R 2400/11; H04R 2499/11
See application file for complete search history.

(56) References Cited

U.S. PATENT DOCUMENTS

| | | | | |
|---|---|---|---|---|
| 10,225,646 | B2 * | 3/2019 | Qin | H04R 1/025 |
| 10,264,335 | B1 * | 4/2019 | Ren | H04R 9/06 |
| 10,462,559 | B2 * | 10/2019 | Zhang | H04R 1/2888 |
| 10,932,033 | B2 * | 2/2021 | Wu | H04R 1/2873 |
| 10,932,038 | B2 * | 2/2021 | Zheng | H04R 1/025 |
| 10,932,039 | B2 * | 2/2021 | Zheng | H04R 1/2842 |
| 10,979,799 | B2 * | 4/2021 | Shi | H04R 1/288 |

(Continued)

FOREIGN PATENT DOCUMENTS

CN 109714677 A * 5/2019

*Primary Examiner* — Edgardo San Martin
(74) *Attorney, Agent, or Firm* — Wiersch Law Group

(57) ABSTRACT

A speaker box includes an upper cover plate, a lower cover plate, a speaker unit, and a motor module. The lower cover plate is assembled with the upper cover plate to define an accommodating cavity for accommodating the speaker unit and the motor module. The speaker unit divides the accommodating cavity into a front cavity and a rear cavity. The motor module is disposed on one side of the speaker unit. The upper cover plate includes a top wall and side walls. A length of at least one of the side walls is greater than a length of an orthographic projection thereof. Edge areas of the upper cover plate and edge areas of the lower cover plate are assembled to define compensation cavities. The lower cover plate is of a single metal sheet structure. Therefore, low-frequency performance of the speaker box is improved.

10 Claims, 4 Drawing Sheets

(56) References Cited

U.S. PATENT DOCUMENTS

| | | | | |
|---|---|---|---|---|
| 11,758,321 | B2 * | 9/2023 | Ren | H04R 1/2842 381/386 |
| 12,389,157 | B2 * | 8/2025 | Yang | H04R 1/2888 |
| 2019/0215600 | A1 * | 7/2019 | Wang | H04R 1/023 |
| 2019/0379958 | A1 * | 12/2019 | Niu | H04R 1/025 |
| 2020/0045414 | A1 * | 2/2020 | Wu | H04R 1/2842 |
| 2020/0045415 | A1 * | 2/2020 | Wu | H04R 1/2873 |
| 2020/0413186 | A1 * | 12/2020 | Qiu | H04R 31/003 |
| 2022/0038823 | A1 * | 2/2022 | Gao | H04R 1/2811 |
| 2023/0143417 | A1 * | 5/2023 | Cho | H04R 1/2807 181/151 |
| 2024/0340561 | A1 * | 10/2024 | Ren | H04R 1/021 |
| 2024/0340575 | A1 * | 10/2024 | Ren | H04R 1/021 |

* cited by examiner

SPEAKER BOX

TECHNICAL FIELD

The present disclosure relates to a technical field of electroacoustic device, and in particular to a speaker box.

BACKGROUND

As shown in FIGS. 1-2, a speaker box in the prior art is regular in appearance. A tail cavity 17 is disposed on one side thereof. An upper cover bracket 12 and an upper cover steel sheet 11 are fixed through glue and assembled with a speaker unit 13. A motor module 14 and a tail cavity cover plate 15 are fixed to the upper cover steel sheet 11 through gluing. Gaps between the motor module 14 and the upper cover bracket 12 and gaps between the motor module 14 and the tail cavity 17 are sealed through glue. This sealing method is more suitable for speaker boxes with regular appearance, such as standard speaker boxes, metal speaker boxes, and so on. However, conventional standard speaker box structures cannot be suitable for speaker boxes with irregular appearance.

Aiming at above problems, it is necessary to provide a speaker box that is reasonable in design and effectively improves the above problems.

SUMMARY

The present disclosure aims to solve at least one of the technical problems in the prior art and provides a speaker box.

The present disclosure provides the speaker box including: an upper cover plate, a lower cover plate, a speaker unit, and a motor module. The lower cover plate is assembled with the upper cover plate to define an accommodating cavity. The speaker unit and the motor module are accommodated in the accommodating cavity. The speaker unit divides the accommodating cavity into a front cavity and a rear cavity. The motor module is disposed on one side, distal from the upper cover plate, of the speaker unit. The upper cover plate includes a top wall and side walls. A length of at least one of the side walls is greater than a length of an orthographic projection of the at least one of the side walls. Edge areas of the upper cover plate and edge areas of the lower cover plate are assembled to define compensation cavities. The compensation cavities are communicated with the rear cavity. The lower cover plate is of a single metal sheet structure so as to increase spaces of the compensation cavities.

In one optional embodiment, supporting steps are disposed at one end, facing the lower cover plate, of the side walls of the upper cover plate. The lower cover plate covers on the supporting steps.

In one optional embodiment, a width of each of the supporting steps ranges from 0.1-0.2 mm.

In one optional embodiment, the lower cover plate and the upper cover plate are fixed through gluing.

In one optional embodiment, a thickness of each of the side walls of the upper cover plate ranges from 0.4 mm to 0.6 mm.

In one optional embodiment, the upper cover plate includes first side walls and second side walls. The first side walls are opposite to each other along a length direction of the upper cover plate. The second side walls are opposite to each other along a width direction of the upper cover plate.

A length of each of the second side walls is greater than a length of a projection of each of the second side walls.

In one optional embodiment, an accommodating through groove is defined on a central area of the lower cover plate. The motor module is disposed in the accommodating through groove.

In one optional embodiment, the compensation cavities are communicated with each other.

In one optional embodiment, mounting holes are defined on the upper cover plate, and/or the mounting holes are defined on the lower cover plate, and the mounting holes are defined on outer sides of the compensation cavities.

In one optional embodiment, a mounting groove is defined on one side, facing the speaker unit, of the upper cover plate. The speaker unit is accommodated in the mounting groove.

A fixing plate is disposed on the upper cover plate along a length direction of the upper cover plate. The fixing plate, the mounting groove, and the upper cover plate are of an injection molding integrated structure.

According to the speaker box disclosed by the present disclosure, the length of the at least one of the side walls of the upper cover plate of the speaker box is greater than the length of the orthographic projection of the at least one of the side walls of the upper cover plate of the speaker box. That is, the upper cover plate has an irregular shape and is suitable for speaker boxes with different shapes, thereby being suitable for various electronic devices and having strong adaptability and wide application. The edge areas of the lower cover plate are assembled with the edge areas of the upper cover plate to define the compensation cavities. The compensation cavities are communicated with the rear cavity. The compensation cavities increase an overall size of the rear cavity, improving low-frequency performance of the speaker unit, and thus improving sound production effect of the speaker unit. The lower cover plate is of the single metal sheet structure so as to increase the spaces of the compensation cavities and maximize a space of the rear cavity, which meets a requirement for a large cavity

DETAILED DESCRIPTION

Figure 1:
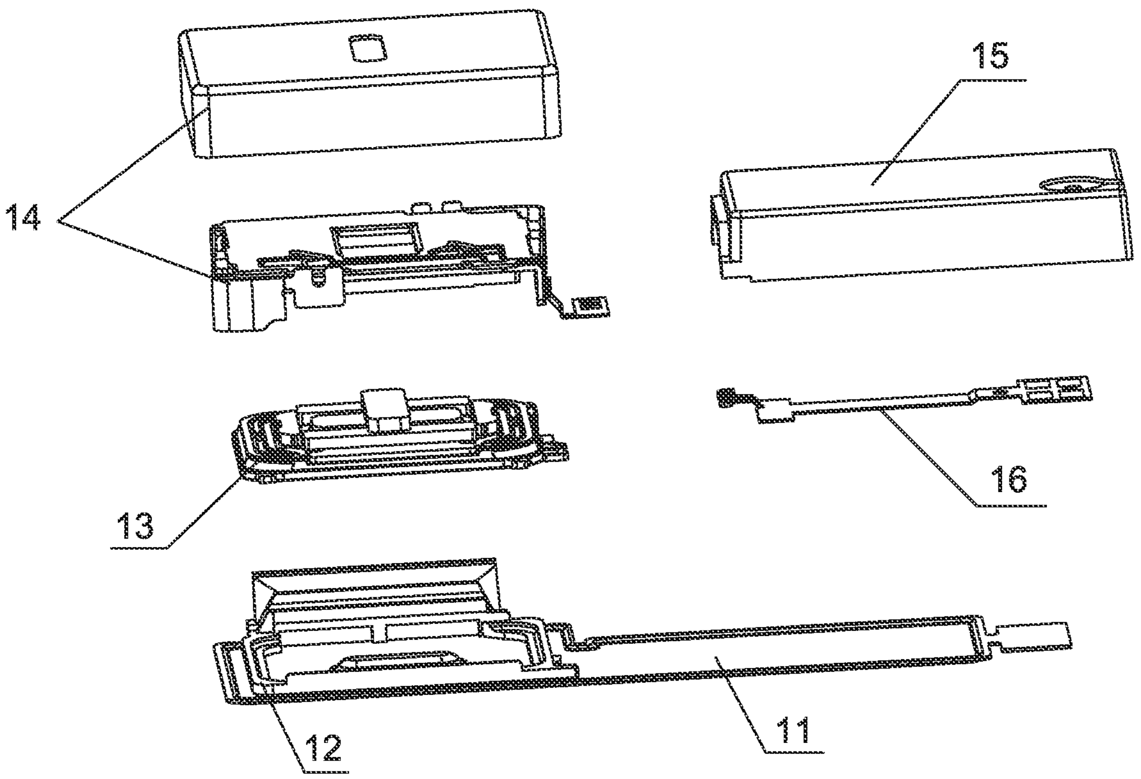
FIG. 1 PRIOR ART
FIG. 1 is an exploded perspective schematic diagram of a speaker box in the prior art.
Figure 2:
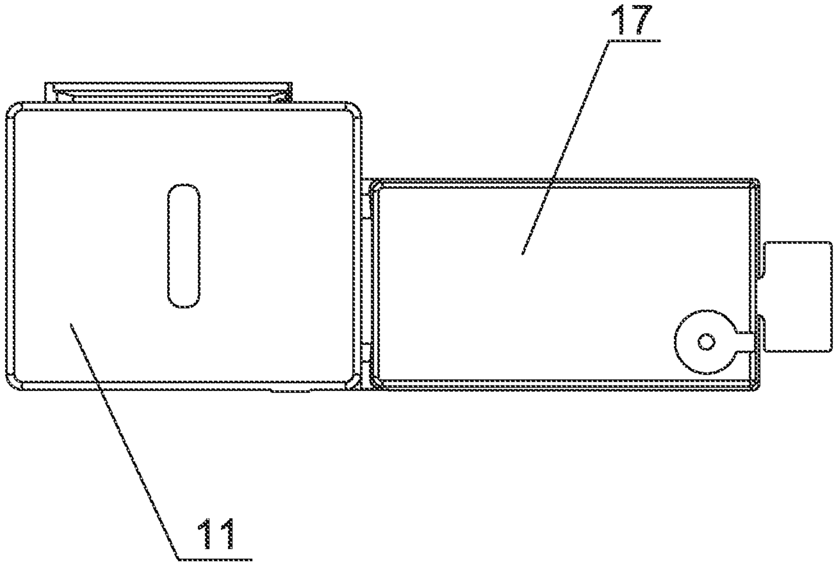
FIG. 2 PRIOR ART
FIG. 2 is an overall structural schematic diagram of the speaker box in the prior art.

In order to enable a person skilled in art to better understand technical solutions of embodiments of the present disclosure, the embodiments of the present disclosure are described in further details below in conjunction with accompanying drawings and specific embodiments.

As shown in FIGS. 3-6, the present disclosure provides a speaker box 100 including an upper cover plate 110, a lower cover plate 130, a speaker unit 140, and a motor module 150. The lower cover plate 130 is assembled with the upper cover plate 110 to define an accommodating cavity 120. The speaker unit 140 and the motor module 150 are accommodated in the accommodating cavity 120. The speaker unit 140 divides the accommodating cavity 120 into a front cavity 121 and a rear cavity 122. The motor module 150 is disposed on one side, distal from the upper cover plate 110, of the speaker unit 140. The upper cover plate 110 includes a top wall 111 and side walls 112. A length of at least one of the side walls 112 is greater than a length of an orthographic projection of the at least one of the side walls 112. That is, a shape of the upper cover plate 110 is not a rectangle as that in the prior art, and at least one of the side walls 112 of the upper cover plate 110 is irregularly shaped.

Specifically, in the embodiment, according to a shape of an electronic device including the speaker box 100, at least one of the side walls 112 of the upper cover plate 110 of the speaker box 100 is set to have a length thereof greater than a length of an orthographic projection thereof. That is, edge areas of the upper cover plate 110 are in irregular shapes. In this way, after the upper cover plate 110 and the lower cover plate 130 are assembled, an extra space other than the speaker unit 140 and the motor module 150 is inevitably present, that is, the edge areas of the upper cover plate 110 have extra spaces. According to shapes of the edge areas of the upper cover plate 110, the extra spaces of the edge areas of the upper cover plate 110 and edge areas of the lower cover plate 130 are assembled to define compensation cavities 160, and the compensation cavities 160 are communicated with the rear cavity 122. That is, the shape of the upper cover plate 110 is matched with a shape of the lower cover plate 130.

The lower cover plate 130 is of a single metal sheet structure so as to increase spaces of the compensation cavities 160. Furthermore, in the embodiment, the structure of the lower cover plate 130 is made into a single steel sheet structure. That is to say, the structure of the lower cover plate 130 is made into the single metal sheet structure, which increases the spaces of the compensation cavities 160 along length directions and width directions of the compensation cavities 160. Spaces of the compensation cavities 160 along height directions thereof are increased through increasing heights of the side walls 112 of the upper cover plate 110.

Figure 5:
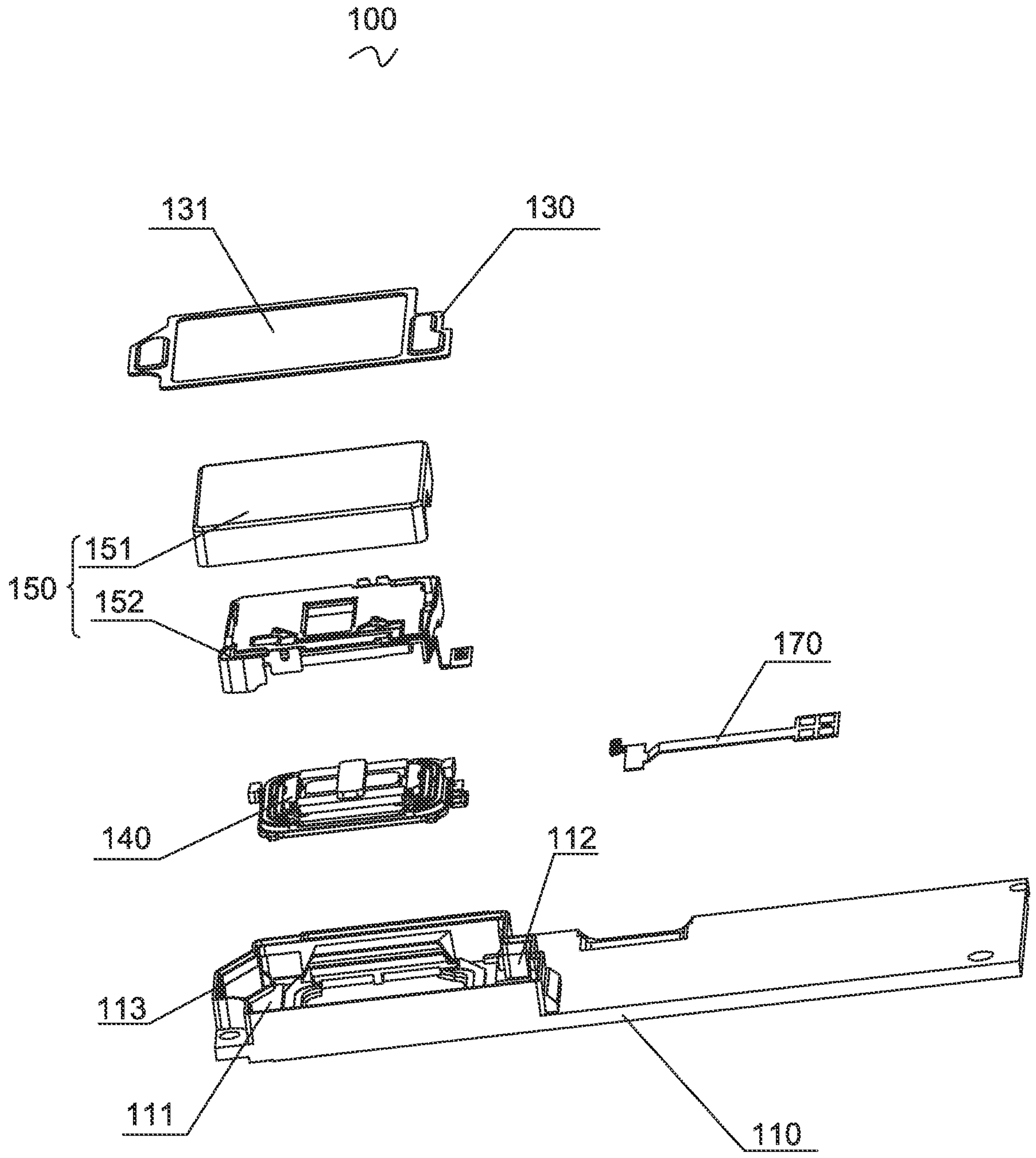
FIG. 5 is an exploded perspective schematic diagram of the speaker box shown in FIG. 1.
Figure 7:
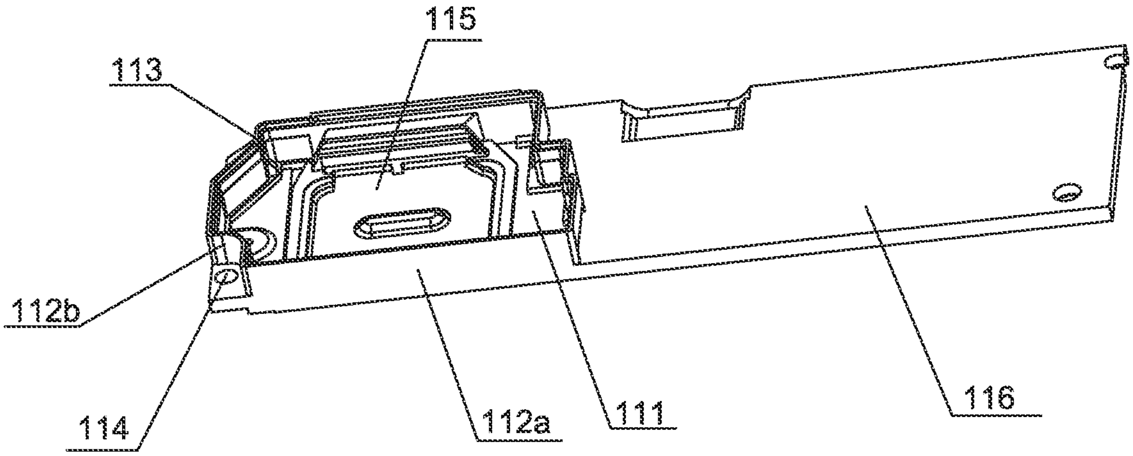
FIG. 7 is a perspective schematic diagram of the upper cover plate according to another embodiment of the present disclosure.

According to the speaker box disclosed by the present disclosure, the length of the at least one of the side walls of the upper cover plate of the speaker box is greater than the length of the orthographic projection of the at least one of the side walls of the upper cover plate of the speaker box. That is, the upper cover plate has an irregular shape and is suitable for speaker boxes with different shapes, thereby being suitable for various electronic devices and having strong adaptability and wide application. The edge areas of the lower cover plate are assembled with the edge areas of the upper cover plate to define the compensation cavities. The compensation cavities are communicated with the rear cavity. The compensation cavities increase an overall size of the rear cavity, improving low-frequency performance of the speaker unit, and thus improving sound production effect of the speaker unit. The lower cover plate is of the single metal sheet structure so as to increase the spaces of the compensation cavities and maximize a space of the rear cavity, which meets a requirement for a large cavity As shown in FIG. 5 and FIG. 7, supporting steps 113 are disposed at one end, facing the lower cover plate 130, of the side walls 112 of the upper cover plate 110. The lower cover plate 130 covers on the supporting steps 113. Specifically, edge areas of the lower cover plate 130 are covered on the supporting steps 113.

In the above embodiment, the lower cover plate 130 is made into the single metal sheet structure, and the edge areas of the lower cover plate 130 are covered on the supporting steps 113, thus further increasing the spaces of the compensation cavities 160, further increasing space of the rear cavity 122, and further improving the low-frequency performance of the speaker unit.

In one optional embodiment, in the embodiment, a width of each of the supporting steps 113 ranges from 0.1-0.2 mm. Furthermore, in the embodiment, the widths of the supporting steps 113 are 0.15 mm. That is to say, in the embodiment, the supporting steps 113 are narrowed to the maximum extent, thus further increasing the spaces of the compensation cavities 160, further increasing the space of the rear cavity 122, and further improving the low-frequency performance of the speaker unit.

In one optional embodiment, the lower cover plate and the upper cover plate are fixed through gluing. Compared with ultrasonic welding fixing method, where a thickness of each of the side walls thereof needs to be at least 0.7 mm, while in the embodiment, the lower cover plate 130 and the upper cover plate 110 are fixed through gluing, and a thickness of each of the side walls 112 of the upper cover plate 110 is not limited by 0.7 mm. That is, the thickness of each of the side walls 112 of the upper cover plate 110 is thinned to be less than 0.7 mm, so as to further increase the spaces of the compensation cavities 160.

In one optional embodiment, a thickness of each of the side walls 112 of the upper cover plate 110 ranges from 0.4-0.6 mm. Furthermore, in the embodiment, the thickness of each of the side walls 112 of the upper cover plate 110 is 0.5 mm.

In the above embodiment, the thickness of each of the side walls 112 of the upper cover plate 110 are set to be from 0.4-0.6 mm, thus increasing the spaces of the compensation cavities 160 to the maximum extent, and further increasing the space of the rear cavity 122.

In one optional embodiment, as shown in FIG. 7, the upper cover plate 110 includes first side walls 112*a* and second side walls 112*b*. The first side walls 112*a* are opposite to each other along a length direction of the upper cover plate 110. The second side walls 112*b* are opposite to each other along a width direction of the upper cover plate 110. A length of each of the second side walls 112*b* is greater than a length of a projection thereof. That is to say, in the embodiment, only the second side walls 112*b* opposite to each other along the width direction of the upper cover plate 110 are in irregular shapes.

Figure 6:
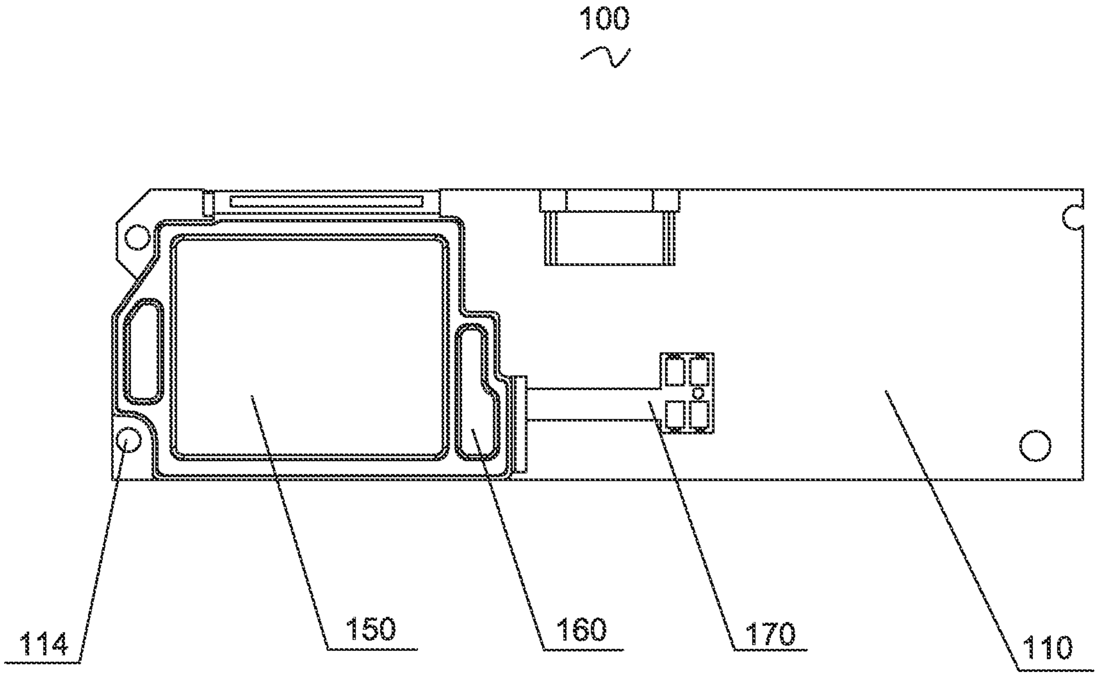
FIG. 6 is an elevational schematic diagram of the speaker box according to another embodiment of the present disclosure.

Specifically, as shown in FIGS. 5-7, in the present embodiment, one of the second side walls 112*b* of the upper cover plate 110 is in a stepped shape recessed towards the speaker unit 140, and the other one of the second side walls 112*b* of the upper cover plate 110 is recessed towards the speaker unit 140 to define an included angle.

It should be noted that in the present embodiment, specific shapes of the side walls 112 of the upper cover plate 110 are not specifically limited, which are selected according to specific shape of the electronic device (such as a mobile phone) configured to receive the speaker box 100. For example, a shape of the speaker box 100 is set according to a shape of a housing of the mobile phone, that is, the shapes of the side walls 112 of the upper cover plate 110 are set according to the shape of the housing of the mobile phone.

In one optional embodiment, as shown in FIG. 5, an accommodating through groove 131 is defined on a central area of the lower cover plate 130. The motor module 150 is disposed in the accommodating through groove 131. That is to say, the central area of the lower cover plate 130 is hollow, and the lower cover plate 130 is similar to a magnetic flux bowl structure.

In the above embodiment, on one hand, the lower cover plate 130 is combined with the upper cover plate 110 to define the accommodating cavity 120 for accommodating the speaker unit 140 and the motor module 150, and on the other hand, the lower cover plate 130 plays a role in supporting the motor module 150. In addition, the accommodating through groove 131 is defined in the central area of the lower cover plate 130, and an outer side of the motor module 150 is sleeved in the accommodating through groove 131, which reduces the height space occupied by the speaker box 100, and meets the requirements for miniaturization of the electronic device.

In one optional embodiment, as shown in FIG. 6, in the embodiment, the compensation cavities 160 are communicated with each other.

In the above embodiment, the compensation cavities 160 are communicated with each other, thus further increasing the overall space of the rear cavity 122, thus further improving the low-frequency performance of the speaker unit.

Figure 3:
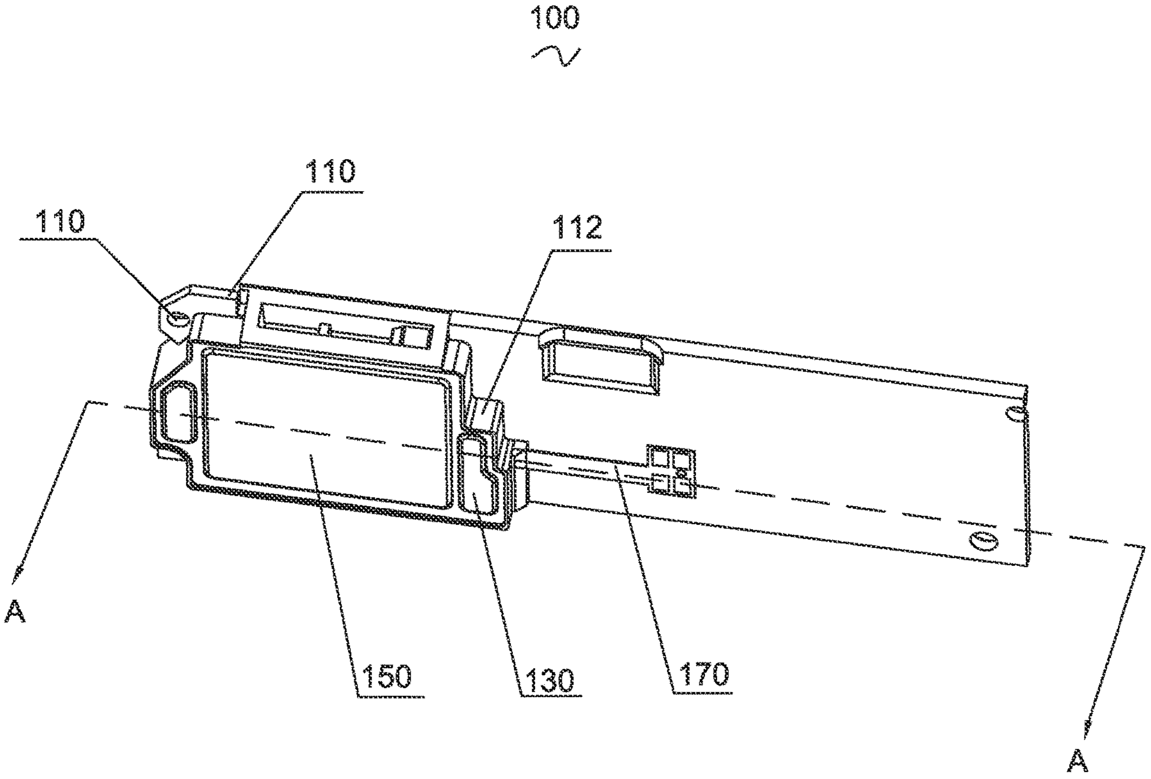
FIG. 3 is an overall structural schematic diagram of a speaker box according to one embodiment of the present disclosure.

In one optional embodiment, as shown in FIG. 3, FIG. 6, and FIG. 7, the speaker box 100 further includes mounting holes 114. The mounting holes 114 are defined on the edge areas of the upper cover plate 110, and/or the mounting holes 114 are defined on the edge areas of the lower cover plate 130, and the mounting holes 114 are located on outer sides of the compensation cavities 160. The mounting holes 114 are configured to fix the speaker box 100 to the electronic device.

That is to say, the mounting holes 114 are only defined on the edge areas of the upper cover plate 110, or the mounting holes 114 are only defined on the edge areas of the lower cover plate 130, or the mounting holes 114 are defined on the edge areas of the upper cover plate 110 and the edge areas of the lower cover plate 130 at the same time. The mounting holes 114 may be defined on the upper cover plate 110 or the lower cover plate 130 according to actual needs. In the embodiment, the mounting holes 114 are defined on the upper cover plate 110.

It should be noted that in the embodiment, the mounting holes 114 are screw holes or other types of mounting holes, which are not specifically limited.

It should be noted that in the embodiment, the number, shapes, sizes, and other parameters of the mounting holes 114 are not specifically limited, and are determined according to the shapes, the sizes, and the like of the electronic device (such as the housing of the mobile phone).

In the above embodiment, the speaker box 100 includes the mounting holes 114, and the speaker box 100 is fixed to the electronic device, such as the housing of the mobile phone and the like, which is suitable for electronic devices in various shapes, and improves adaptability of the speaker box 100.

In one optional embodiment, as shown in FIG. 7, a mounting groove 115 is defined on one side, facing the speaker unit 140, of the upper cover plate 110. The speaker unit 140 is accommodated in the mounting groove 115.

Figure 4:
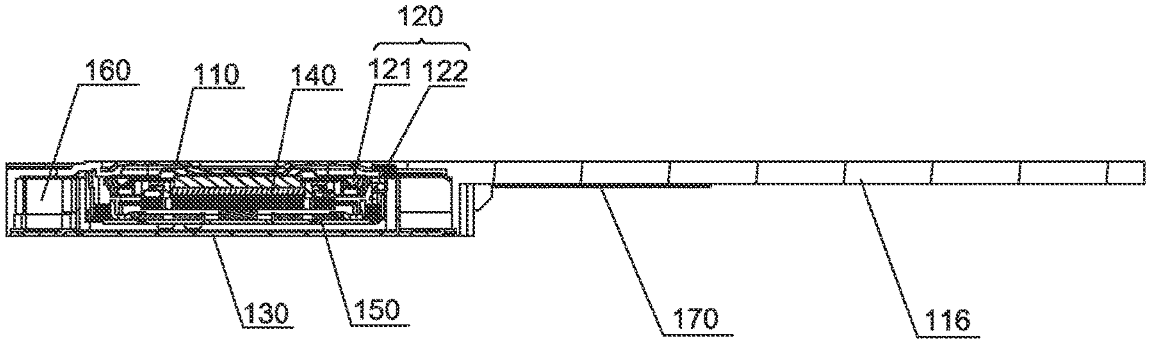
FIG. 4 is a cross-sectional schematic diagram of the speaker box taken along the line A-A shown in FIG. 1.

As shown in FIG. 4 and FIG. 7, a fixing plate 116 is disposed on the upper cover plate 110 along a length direction of the upper cover plate 110. The speaker box 100 is fixed to the electronic device through the fixing plate 116. The fixing plate 116, the mounting groove 115, and the upper cover plate 110 are of an injection molding integrated structure. Furthermore, in the embodiment, the fixing plate 116, the mounting groove 115, and the upper cover plate 110 are an integrally injection-molded steel sheet.

In the above embodiment, the fixing plate 116, the mounting groove 115, and the upper cover plate 110 are of an injection molding integrated structure, which are integrated into a single module, simple in structure and convenient in installation.

In one optional embodiment, as shown in FIG. 5, the motor module 150 includes a housing 151 and a vibration module 152. The housing 151 and the upper cover plate 110 define an accommodating space. The vibration module 152 is accommodated in the accommodating space.

In one optional embodiment, the lower cover plate 130 is sleeved on an outer side of the housing 151. at least one sealing strip is disposed at gaps between the lower cover plate 130 and the housing 151, where the at least one sealing strip is not shown in the figures.

In the embodiment, the at least one sealing strip is made from sealing glue, certainly, other materials are adopted for the sealing strips, which are not specifically limited.

In the above embodiment, the at least one sealing strip is disposed at the gaps between the lower cover plate 130 and the housing 151, thus improving sealing performance between the lower cover plate 130 and the housing 151, and then improving sealing performance of the speaker box 100.

In one optional embodiment, as shown in FIGS. 3-6, the speaker box 100 further includes a circuit board 170. A first end of the circuit board 170 is electrically connected to the speaker unit 140 and the motor module 150. A second end of the circuit board 170 is configured to be electrically connected to an external circuit. In the embodiment, the circuit board 170 is a flexible circuit board.

In the above embodiment, the speaker unit 140 and the motor module 150 are electrically connected to the external circuit through the circuit board 170, so that sound generation of the speaker unit 140 and vibration of the motor module 150 are respectively realized.

It is understood that the above embodiments are merely exemplary embodiments configured to illustrate principles of the embodiments of the present disclosure, but the embodiments of the present disclosure are not limited thereto. For the person of ordinary skill in the art, various modifications and improvements can here made without departing from spirit and essence of the embodiments of the present disclosure, and these variations and improvements are further considered to be within a protection scope of the embodiments of the present disclosure.

What is claimed is:

1. A speaker box, comprising:

an upper cover plate;

a lower cover plate;

a speaker unit; and a motor module;

wherein the lower cover plate is assembled with the upper cover plate to define an accommodating cavity, the speaker unit and the motor module are accommodated in the accommodating cavity, the speaker unit divides the accommodating cavity into a front cavity and a rear cavity; the motor module is disposed on one side, distal from the upper cover plate, of the speaker unit; the upper cover plate comprises a top wall and side walls, a length of at least one of the side walls is greater than a length of an orthographic projection of the at least one of the side walls, edge areas of the upper cover plate and edge areas of the lower cover plate are assembled to define compensation cavities, the compensation cavities are communicated with the rear cavity, and the lower cover plate is of a single metal sheet structure so as to increase spaces of the compensation cavities.

2. The speaker box according to claim 1, wherein supporting steps are disposed at one end, facing the lower cover plate, of the side walls of the upper cover plate; and the lower cover plate covers on the supporting steps.

3. The speaker box according to claim 2, wherein a width of each of the supporting steps ranges from 0.1-0.2 mm.

4. The speaker box according to claim 1, wherein the lower cover plate and the upper cover plate are fixed through gluing.

5. The speaker box according to claim 4, wherein a thickness of each of the side walls of the upper cover plate ranges from 0.4-0.6 mm.

6. The speaker box according to claim 1, wherein the upper cover plate comprises first side walls and second side walls, the first side walls of the upper cover plate are opposite to each other along a length direction of the upper cover plate, the second side walls of the upper cover plate are opposite to each other along a width direction of the upper cover plate, and a length of each of the second side walls is greater than a length of a projection of each of the second side walls.

7. The speaker box according to claim 1, wherein an accommodating through groove is defined on a central area of the lower cover plate, and the motor module is disposed in the accommodating through groove.

8. The speaker box according to claim 1, wherein the compensation cavities are communicated with each other.

9. The speaker box according to claim 1, wherein mounting holes are defined on the upper cover plate; and/or, the mounting holes are defined on the lower cover plate, and the mounting holes are defined on outer sides of the compensation cavities.

10. The speaker box according to claim 1, wherein a mounting groove is defined on one side, facing the speaker unit, of the upper cover plate; and the speaker unit is accommodated in the mounting groove, and a fixing plate is disposed on the upper cover plate along a length direction of the upper cover plate; and the fixing plate, the mounting groove, and the upper cover plate are of an injection molding integrated structure.

* * * * *